(12) United States Patent
Beeson, Jr. et al.

(10) Patent No.: US 6,415,549 B1
(45) Date of Patent: *Jul. 9, 2002

(54) WATER CONSERVATION PLANT CONTAINER

(75) Inventors: Richard C. Beeson, Jr., Eustis; Dorota Z. Haman, Gainesville; Gary W. Knox, Tallahassee; Allen G. Smajstrla; Thomas H. Yeager, both of Gainesville, all of FL (US)

(73) Assignee: University of Florida Research Foundation, Inc., Gainesville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 508 days.

(21) Appl. No.: 08/614,358

(22) Filed: Mar. 12, 1996

(51) Int. Cl.[7] .................................................. A01G 9/02
(52) U.S. Cl. ....................... 47/84; 47/39; 47/25; 47/86; 47/87
(58) Field of Search ........................... 47/84 C, 84 BC, 47/39 P, 25, 86, 87

(56) References Cited

U.S. PATENT DOCUMENTS

| | | | | |
|---|---|---|---|---|
| 205,252 A | * | 6/1878 | Delany | 47/25 |
| 2,785,508 A | * | 3/1957 | Coleman, Jr. | 47/25 |
| 3,415,011 A | * | 12/1968 | Hornbostel, Jr. | 47/39 P |
| 4,977,703 A | * | 12/1990 | Blanc | 47/84 C |
| 5,142,818 A | * | 9/1992 | Weigert | 47/25 |
| 5,184,421 A | * | 2/1993 | Meharg | 47/84 C |
| 5,446,995 A | * | 9/1995 | Huber | 47/86 |

FOREIGN PATENT DOCUMENTS

| | | | | |
|---|---|---|---|---|
| DE | 3331532 | * | 9/1983 | 47/84 C |
| DE | 4107233 | * | 9/1992 | 47/25 R |

* cited by examiner

Primary Examiner—Peter M. Poon
Assistant Examiner—Bethany L Griles
(74) Attorney, Agent, or Firm—Thomas C. Saitta

(57) ABSTRACT

A container for growing plants comprising a main body with an open top and perimeter rim, and a funnel-like water collection means having an inner mating perimeter adapted to adjoin the perimeter rim, an outer mating perimeter of greater size than the inner mating perimeter and a sloping surface connecting the outer mating perimeter to the inner mating perimeter, such that overhead water is captured and directed into the open top. The water collection means may be detachable. The water collection means has mating edges adapted to continuously and contiguously abut mating edges of like containers to form a solid water capture surface in all directions when multiple containers are properly positioned.

28 Claims, 2 Drawing Sheets

WATER CONSERVATION PLANT CONTAINER

BACKGROUND OF THE INVENTION

This invention relates generally to containers used by plant nurseries to grow plants for subsequent sale when matured. More particularly, the invention relates to plant containers in which individual plants are produced in corresponding containers containing a soil-like growth mixture, the container retaining root growth in its interior. Even more particularly, the invention relates to plant containers having means to improve the collection of overhead water, either from rain or overhead irrigation means, the improved collection means comprising a funnel-like member extending beyond the perimeter of the main container body to increase the exposed upper surface area, with the funnel-like member having a perimeter configured to abut with other such containers to create a continuous, large-area, capture surface to prevent overhead water from falling into the spacing gaps between containers.

Nearly all landscape shrubs and a large percentage of small trees are produced in containers configured as slightly tapered cylinders with a flat circular bottom, one or more drainage holes, an upstanding annular side wall and an open circular top. These containers are typically denoted as one gallon, three gallon, five gallon, etc., containers. Container production provides many advantages over field production, but plant growth in the containers results in constricted root growth, which means that container grown plants must be irrigated much more frequently than field grown containerless plants planted directly in the ground. To produce marketable plants with good branch and leaf spread, called canopies, the containers are typically required to be spaced apart some distance—sometimes a distance equal to or greater than the diameter of the container itself. Because of this spacing, a majority of the water from rain and overhead irrigation from sprinkler systems falls between the containers and is wasted if not otherwise collected and reused. In addition, the plant canopies themselves direct water outside of the container perimeter. In many nursery circumstances the plant containers may cover less than 15 percent of the available ground area, and on average only between 15 and 40 percent of the overhead water will be captured by the containers and delivered to the plant roots. In circumstances where the containers are small and canopy spread is large, as little as 5 percent of the overhead water will be captured by the containers. This means that from 60 to 95 percent of the overhead water is wasted. An average sized nursery will use between 70 and 120 acre-inches of water per year, with an acre-inch equalling approximately 27,000 gallons of water. In the Southwest Florida Water Management District, a district covering roughly one-fifth of the state of Florida, landscape nurseries cover approximately 6500 acres and are allocated approximately 35 million gallons of water each day. Because the containers are designed to drain efficiently, daily irrigation is required throughout most of the year. Using the optimum efficiency figure for water capture of 40 percent, this means that over 21 million gallons of water may be wasted each day in this one district.

Despite the inefficiency of overhead irrigation from sprinkler systems, it is currently the only economically feasible method to supply water to multiple small containers. Alternatives to overhead irrigation, such as micro-irrigation by supplying small water supply tubes to each container, wicking or capillary draw of water from reservoirs beneath the containers and direct manual watering, are excessively costly, require high maintenance and often do not produce optimum growth in landscape plants.

It is an object of this invention to provide a plant cultivation container which increases the capture of overhead water by providing a larger than normal upper surface area which directs the captured water into the growth medium within the container. It is a further object to provide such a container which is low cost, which does not require changes in systems currently used to transport or fill the container pots, and which does not require the nurseries to change their current sprinkler systems for delivering overhead irrigation. It is a further object to provide such a container either as a preformed unitary device or as a multiple component device with an adaptor used in conjunction with standard cylindrical containers. It is a further object to maximize the capture of overhead water by providing containers adapted to abut to provide a continuous capture surface even when the main bodies containing the growth medium are separated a predetermined distance for optimum plant canopy growth. It is a further object to provide such a container which when used in multiples shades the plant roots from the sun and entraps ground heat in winter.

SUMMARY OF THE INVENTION

The invention comprises in general a container having a main body portion formed by the conjunction of a bottom and an annular side wall if round and multiple side walls if polygonal in cross-section, the main body having an open top with a perimeter rim, and funnel-like water collection means. The main body is adapted to receive soil or soil-like growth medium and the roots of a plant being cultivated. Typically one or more drain holes are provided to allow drainage of excess water. Adjoined to the perimeter rim of the container main body is a funnel-like overhead water collection means which comprises a sloping surface or surfaces, an inner mating perimeter and an outer perimeter, with the surfaces sloping downwards from the outer perimeter to the inner perimeter. The outer perimeter of the collection means is greater in size than the perimeter rim of the main body of the container. In this manner the available exposed upper surface area for capturing overhead water from rain of irrigation is significantly increased beyond the surface area of the open top of the container main body, with the extra captured water being directed down the sloping surfaces into the interior of the main body to saturate the growth mixture and provide water for the growing plant.

The outer perimeter of the water collection means is configured so as to provide mating edges on all sides which can be abutted in a continuous, contiguous manner to the mating edges of other similarly configured containers, such that when multiple containers are abutted there is formed a two-dimensional enlarged water capture surface with no space or gap between containers through which water may uselessly fall. Preferably, the outer perimeter of the collection means is configured as a square with four equal mating edges. Other polygonal configurations are also possible, such as triangular or hexagonal, as well as configurations with non-linear shapes which are capable of continuously mating on all edges to form a complete surface with no gaps.

The container of the invention may be formed as a single unit including the water collection means, or the water collection means may be a separate member attachable to a standard container. The water collection means may be formed with a circular or annular inner mating perimeter adapted to externally abut the perimeter rim of the open top of the container main body, such that the main body of the container is inserted into the water collection means. The water collection means may be formed with an annular inner mating perimeter having a depending flange adapted to fit within the perimeter rim of the open top of the main body. The water collection means and the perimeter rim of the container may be formed to mechanically adjoin to secure the water collection means onto the container. The water collection means may be formed with depending insertion members or stakes adapted to be inserted into the growth mixture to secure the water collection means onto the container. The water collection means may be provided with a slit extending from the outer perimeter to the inner perimeter, allowing the water collection means to be affixed to a container with a plant having a large canopy by separating the slit and passing the trunk of the plant through the open area. The slit may be held together by the rigidity of the material composing the water collection means, or mechanical or adhesive joining means may be employed. Structural members, such as ridges or channels, may be employed on the sloping surfaces to improve rigidity, and apertures may be provided on the upper portions of the sloping surfaces to allow for release of excess captured water. The water collection means may be formed of materials providing some flexibility or configured in a hinge-like manner, whereby a nursery worker can walk between multiple contiguous containers with segments of the water collection means flexing upward to allow for passage of the worker's leg and foot. The water collection means may further incorporate joining members to allow the containers to be secured to the ground or to each other, such as corresponding tabs and slots, or apertures or loops to receive rods or string.

DETAILED DESCRIPTION OF THE INVENTION

The invention will now be described in detail with regard to the best mode and preferred embodiment, with reference to the various drawing figures. Alternative embodiments will also be described.

Figure 1:
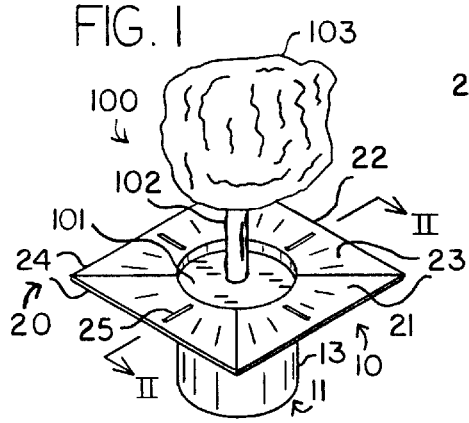
FIG. 1 is a perspective view of the invention.
Figure 2:
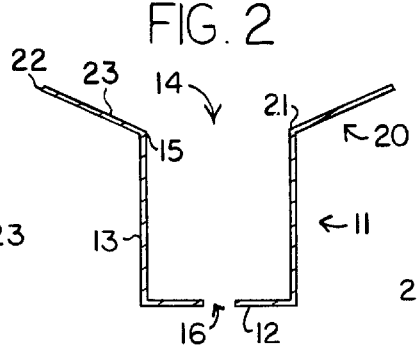
FIG. 2 is a cross-sectional view of the invention taken along line II—II of FIG. 1, with the plant and growth mixture omitted.

As shown in FIGS. 1 and 2, the invention is a container 10 for cultivating and maturing a plant 100 growing in soil or growth mixture 101. The container 10 comprises in general a main body 11 formed by the combination of a generally flat circular bottom 12 and annular side wall 13, the combination resulting in an open top 14 and a circular perimeter lip or rim 15 along the top of side wall 13. The main body 11 could also be formed in a polygonal or other non-circular configuration. The main body 11 is typically provided with at least one drain hole 16 to allow for drainage of excess water. The main body receives the growth mixture 101 and the root system of the plant 100, with the plant stem or trunk 102 extending through the open top 14 with the plant canopy 103, the combination of leaves and branches, spreading above the container 10.

Attached to the main body 11 of container 10 is water collection means 20. Water collection means 20 provides means to capture, collect and deliver overhead water into the open top 14, thereby watering the growth mixture 101. Overhead water is defined to be any water coming from a delivery system which sprays or sprinkles water over the plant 100 from above, such as water from an overhead irrigation system or rotating sprinkler irrigation system, and also includes rain water. Water collection means 20 comprises an inner mating perimeter 21, an outer mating perimeter 22 and at least one sloping surface 23. The outer perimeter 22 is positioned higher than the inner perimeter 21, such that the sloping surface 23 slopes downwards from the outer perimeter 22 to the inner perimeter 21. The surface 23 between the outer perimeter 22 and the inner perimeter 21 may be segmented into sections as shown. Thus any water which strikes the water collection means 20 will be directed down toward the inner perimeter 21. The inner perimeter 21 of the water collection means 20 is adapted to correspondingly mate with the perimeter rim 15 of the main body 11, such that water captured or collected by the water collection means 20 will be delivered directly into the open top 14 and into the growth mixture 101. The container 10 may be formed such that the water collection means 20 and the main body 10 are a unitary member, as shown in FIGS. 1 and 2. The invention may be formed of any suitable material having sufficient strength, rigidity, durability, and water impermeability characteristics to effectively retain the growth mixture 101 and plant 100 during the entire growth period, and is preferably composed of a relatively thin plastic material.

The dimensions of the outer perimeter 22 of the water collection means 20 are greater than the dimensions of the open top 14 of the main body 11, such that the exposed-upper surface area of the combination of the open top 14 and water collection means 20 is much greater than the exposed upper surface area of the open top 14 alone. For example, for an open top 14 having a diameter of 6 inches with water collection means 20 sized 12 inches between opposite mating edges 24 and where the outer perimeter 22 of the water collection means 20 is configured as a square, the total exposed upper surface for the combined components is 144 square inches, as opposed to less than 29 square inches for the open top 14 alone. In this example the effective capture area has been increased almost 5-fold. The water collection means 20 may even extend the sloping surface 23 beyond the spread of the plant canopy 103, such that overhead water diverted away from the open top 14 by the canopy 103 now falls onto the sloping surface 23 within the outer perimeter 22 and is captured.

Figure 4:
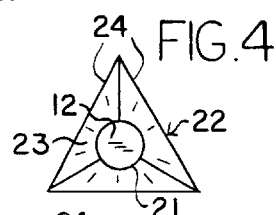
FIG. 4 is a top view of an alternative embodiment showing a triangular outer perimeter.
Figure 5:
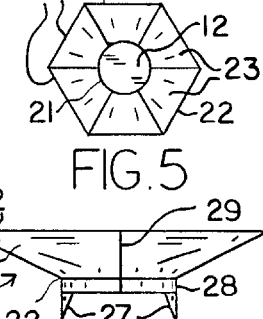
FIG. 5 is a top view of an alternative embodiment showing a hexagonal outer perimeter.
Figure 3:
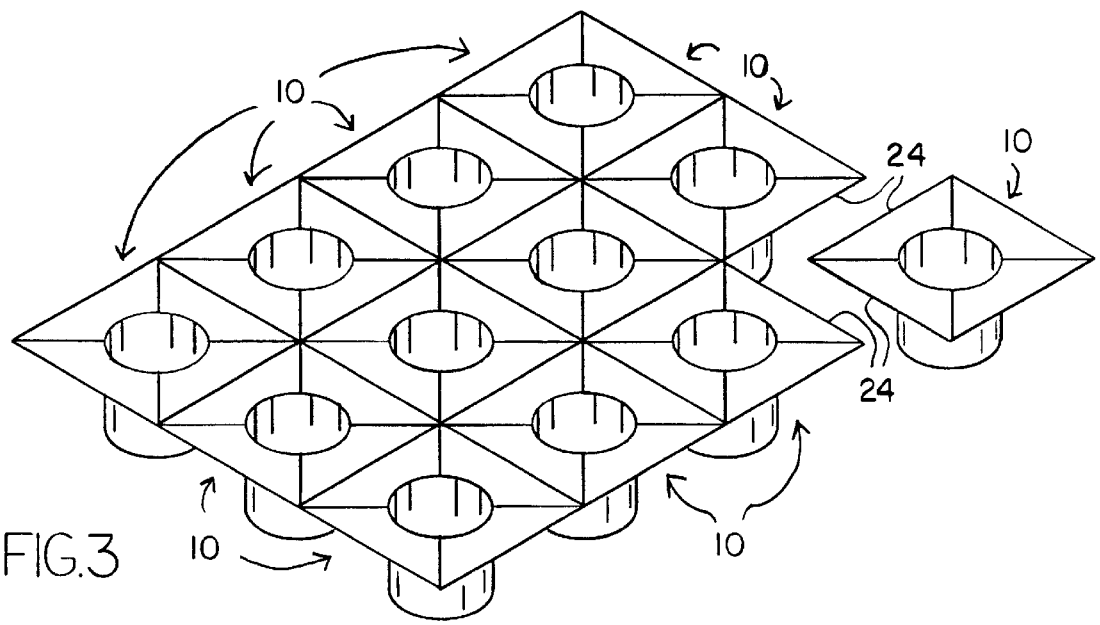
FIG. 3 is a perspective view of a number of containers placed in contiguous arrangement to form an extended water capture surface.
Figure 6:
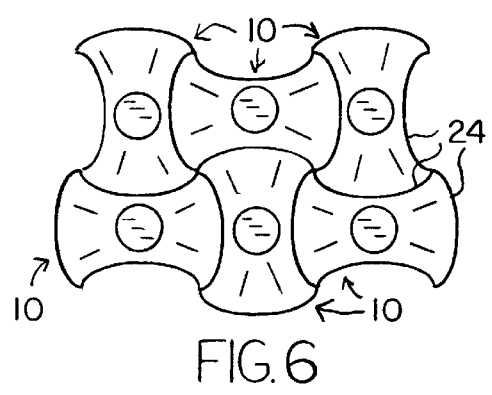
FIG. 6 is a top view of multiple containers having a non-polygonal perimeter and non-linear mating edges.

In addition to dramatically increasing the effective capture area for directing water into the growth mixture 101, thereby reducing water waste and loss, the water collection means 20 is configured whereby multiple containers 10 may be positioned in an adjacent, contiguous manner to each other to form an extended, continuous capture surface with no spacing or gaps between the main bodies 11 which would allow overhead water to fall uselessly to the ground. Such a combination of multiple containers 10 is shown in FIG. 3. To accomplish this, the outer perimeter 22 of the water collection means 20 must be configured to have mating edges 24 which are adapted such that each mating edge 24 will continuously mate with a mating edge 24 of a separate water collection means 20, leaving no gaps or spacing in between. The mating edges 24 are configured such that this continuous mating may occur in all directions, such that the extended capture surface may extend in all directions with no gaps or spacing. The preferred configuration to accomplish this is to provide a square outer perimeter 23 and linear mating edges 24, as shown in FIGS. 1 and 3. Alternatively, other polygonal configurations may be utilized for the outer perimeter 22, such as a triangular configuration as shown in FIG. 4 or a hexagonal configuration as shown in FIG. 5. Likewise, non-polygonal configurations with non-linear mating edges 24 are possible, such as shown in FIG. 6, as long as the containers 10 mate with no gaps or spacers to form the extended capture area.

The water collection means 20 is preferably formed of the same material as the main body 11, but any material or combination of materials with suitable strength, rigidity and water impermeability may be utilized. It is preferred that thin, relatively rigid plastic be used, with the provision of structural members 25, such as ridges or channels, to further increase the rigidity if necessary. Additionally, it is also contemplated that in the alternative less rigid sheets of plastic or fabric could be mounted onto rigid frames to form the water collection means 20. The rigidity of the water collection means 20 may be designed such that there is enough rigidity to collect funnel water into the open top 14 but enough flexibility to allow part of the sloped surface 23 to be forced upward by the leg or foot of a worker, thus allowing a worker to walk between adjacent rows of containers 10.

Figure 8:
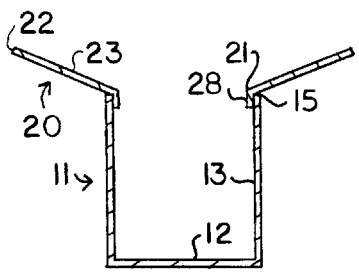
FIG. 8 is a cross-sectional view, similar to FIG. 7, showing the separate water collection means mounted internally to the container.
Figure 7:
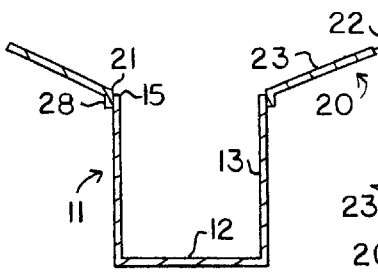
FIG. 7 is a cross-sectional view, similar to FIG. 2, showing an embodiment of the invention where the water collection means is separate from and mounted externally to the container.
Figure 9:
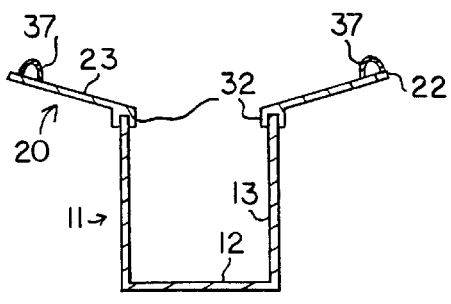
FIG. 9 is a cross-sectional view, similar to FIG. 8, showing the separate water collection means mounted to the container in a mechanical interlock manner.

As an alternative to a container 10 formed in a unitary manner with the water collection means 20 and main body 11 joined a shown in FIG. 2, the water collection means 20 may also be provided as a separate member adapted to be connected to a container 10, as shown in FIGS. 7 through 11. As shown in FIG. 7, the inner perimeter 21 may be formed as a circular opening or depending annular flange 28 sized correspondingly to the outer dimensions of the perimeter 15 of the open top 14 of the main body 11 of container 10, which allows the water collection means 20 to be adjoined to a standard container 10 by dropping the container 10 through the inner perimeter 21. The water collection means 20 may be retained in proper position at the top of the side wall 13 by a friction fit, mechanical fasteners or adhesives. By providing the water collection means 20 as a separate member, the water collection means 20 may be removed from the container 10 when the plant 100 is sold and reused on another container 10. An alternative embodiment is shown in FIG. 8, in which the water collection means 20 is designed with its inner mating perimeter 21 comprising a depending annular flange 28 sized to fit within the perimeter rim 15 of the open top 14. In this embodiment the water collection means 20 will be maintained in place by gravity, or the depending flange 28 may be extended sufficient depth to be inserted into the growth mixture 101. Still another embodiment for joining the separate water collection means 20 to the container 10 is shown in FIG. 9, where the inner perimeter 21 is configured with mechanical connecting or interlocking means 32, such as an annular channel, to receive the perimeter rim 15 of the container 10.

Figure 10:
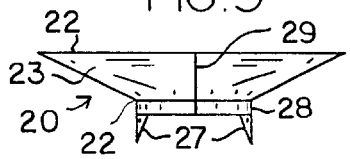
FIG. 10 is a side view of a separate water collection means showing insertion members and a separation slit.
Figure 11:
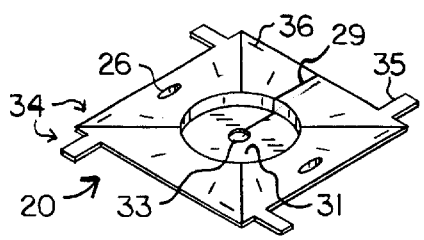
FIG. 11 is a perspective view of a separate water collection means having a soil covering member and excess water relief apertures.

As shown in FIGS. 9 and 11, the water collection means 20 may be provided with joining members 34 to allow the containers 10 to be secured to the ground or to each other to prevent tipping. The joining members 34 may comprise tabs 35 and corresponding tab slots 36 as shown in FIG. 11, or may comprise apertures or loops 37 to receive rods, wires ropes, string or the like. As shown in FIG. 10, the water collection means 20 may also be provided with depending insertion members 27, such as tabs or spikes, which can be inserted into the growth mixture 101 to secure the water collection means 20 in place. Additionally, the water collection means 20 may be provided with a slit 29, as shown in FIGS. 10 and 11, which allows the water collection means 20 to be opened and installed on the container 10 around the stem 102 of a plant 100, or opened and removed. As shown in FIG. 11, the water collection means 20 can also be provided with a circular soil covering member 31 having a central stem aperture 33 to encircle the plant stem 102. Soil covering member 31 may be apertured to allow water penetration or the stem aperture 33 may be sized sufficiently large to allow water to enter the growth mixture 101. Soil covering member 31 reduces moisture losses through evaporation, retains heat in cold weather, shades the roots in sunny weather and retards weed growth. The water collection means 20 may also be provided with excess water relief apertures 26 positioned near the outer perimeter 22 to reduce the possibility of excess water weight forcing the outer perimeter 22 downward. Multiple containers 10 may be set into reservoir trays to collect excess water which drains from the drain holes 16. The containers 10 or the water collection means 20 may be constructed in various colors which have been found to promote growth or deter pests.

It is understood that equivalents and substitutions for elements of the above described invention may be obvious to those skilled in the art, and the true scope and definition of the invention therefore is to be as set forth in the following claims.

We claim:

1. A system for reducing water losses from overhead irrigation of multiple plant containers by capturing overhead water falling between adjacent plant containers and directing the water into the plant containers, said system comprising a plurality of adjacent individual plant growth containers for growing plants, each said container comprising a main body to receive growth medium and the roots of a plant and water collection means to capture overhead water and direct said overhead water to said main body, said main body having an open top and perimeter rim, said water collection means having an inner mating perimeter attached to said perimeter rim of said main body adjacent said open top, an outer mating perimeter having greater dimensions and located higher than said inner mating perimeter, and a sloping surface connecting said outer mating perimeter and said inner mating perimeter, where said outer mating perimeter has mating edges configured to abut in a continuous, contiguous manner with corresponding mating edges of other said containers, and where said mating edges of each said container are abutted with mating edges of adjacent other said containers to form a continuous water capture surface such that all overhead water is captured and directed into said main bodies of said containers such that no water falls between adjacent said containers.

2. A system for reducing water losses from overhead irrigation of multiple plant containers by capturing overhead water falling between adjacent plant containers and directing the water into the plant containers, said system comprising a plurality of devices being water collection means for capturing overhead water and directing said water into individual containers each containing a plant, each said container having an open top and perimeter rim, each said device comprising an inner mating perimeter which connects to said perimeter rim of one of said containers adjacent said open top over the full extent of said perimeter rim, an outer mating perimeter having greater dimensions and located higher than said inner mating perimeter, and a sloping surface connecting said outer mating perimeter and said inner mating perimeter, where said outer mating perimeter has mating edges configured to abut in a continuous, contiguous manner with corresponding mating edges of other said containers, and where said mating edges of each said device are abutted with mating edges of adjacent other said devices to form a continuous water capture surface such that all overhead water is captured and directed into said main bodies of said containers such that no water falls between adjacent said containers.

3. The system of claim 1, where each said perimeter rim is circular and each said outer mating perimeter is square.

4. The system of claim 1, where each said outer mating perimeter is polygonal.

5. The system of claim 1, further comprising joining members to connect said water collection means of said containers to water collection means of other like containers.

6. The system of claim 1, where said mating edges are capable of abutting said corresponding mating edges of other like containers in a continuous, contiguous manner in multiple directions.

7. The system of claim 1, where each said sloping surface further comprises structural members to increase rigidity.

8. The system of claim 1, where each said water collection means is detachable from said main body.

9. The system of claim 1, where each said perimeter rim is circular and each said outer mating perimeter is square.

10. The system of claim 8, where said outer mating perimeter is polygonal.

11. The system of claim 8, further comprising joining members to connect said water collection means of said containers to water collection means of other like containers.

12. The system of claim 8, where said mating edges are capable of abutting said corresponding mating edges of other like containers in a continuous, contiguous manner in multiple directions.

13. The system of claim 8, where each said inner mating perimeter of said water collection means is sized greater than said perimeter rim.

14. The system of claim 8, where each said inner mating perimeter of said water collection means is sized smaller than said perimeter rim and further comprises a depending flange.

15. The system of claim 14, further comprising insertion members adapted to be inserted into said growth medium.

16. The system of claim 8, where each said water collection means further comprises mechanical connecting means to connect said water collection means to said main body.

17. The system of claim 8, where each said water collection means further comprises a slit extending from said inner mating perimeter to said outer mating perimeter.

18. The system of claim 17, each said water collection means further comprising a soil covering member and stem aperture.

19. The system of claim 2, where each said perimeter rim is circular and each said outer mating perimeter is square.

20. The system of claim 2, where each said outer mating perimeter is polygonal.

21. The system of claim 2, further comprising joining members to connect said water collection means of said containers to water collection means of other like containers.

22. The system of claim 2, where said mating edges are capable of abutting said corresponding mating edges of other like containers in a continuous, contiguous manner in multiple directions.

23. The system of claim 2, where each said inner mating perimeter of said water collection means is sized greater than said perimeter rim.

24. The system of claim 2, where each said inner mating perimeter of said water collection means is sized smaller than said perimeter rim and further comprises a depending flange.

25. The system of claim 24, further comprising insertion members adapted to be inserted into said growth medium.

26. The system of claim 2, where each said water collection means further comprises mechanical connecting means to connect said water collection means to said main body.

27. The system of claim 2, where each said water collection means further comprises a slit extending from said inner mating perimeter to said outer mating perimeter.

28. The system of claim 2, each said water collection means further comprising a soil covering member and stem aperture.

* * * * *